(12) United States Patent
Wang

(10) Patent No.: US 12,421,764 B2
(45) Date of Patent: Sep. 23, 2025

(54) BIOMETRIC FINGERPRINT SAFE

(71) Applicant: Mingjie Wang, Puning (CN)

(72) Inventor: Mingjie Wang, Puning (CN)

( * ) Notice: Subject to any disclaimer, the term of this patent is extended or adjusted under 35 U.S.C. 154(b) by 316 days.

(21) Appl. No.: 17/676,903

(22) Filed: Feb. 22, 2022

(65) Prior Publication Data
US 2023/0212881 A1 Jul. 6, 2023

(30) Foreign Application Priority Data

Jan. 6, 2022 (CN) .......................... 202220029864.6

(51) Int. Cl.
*E05B 47/00* (2006.01)
*E05B 65/00* (2006.01)
(Continued)

(52) U.S. Cl.
CPC ...... *E05B 47/0012* (2013.01); *E05B 65/0075* (2013.01); *E05F 15/53* (2015.01);
(Continued)

(58) Field of Classification Search
CPC ............. E05B 65/0075; E05B 65/0092; E05B 65/5246; E05B 65/5253; E05B 65/5269;
(Continued)

(56) References Cited

U.S. PATENT DOCUMENTS 5,498,040 A * 3/1996 Silye ....................... E05B 81/14
292/201
5,701,770 A * 12/1997 Cook ..................... E05B 47/02
382/124
(Continued)

FOREIGN PATENT DOCUMENTS

CN 107035242 A * 8/2017
CN 109252752 A * 1/2019 ......... E05B 17/2084
(Continued)

OTHER PUBLICATIONS

Computer Generated Translation for CN 112647542, Generated on Jun. 17, 2024, https://worldwide.espacenet.com/ (Year: 2024).*
(Continued)

*Primary Examiner* — Alyson M Merlino
(74) *Attorney, Agent, or Firm* — JEEN IP LAW, LLC

(57) ABSTRACT

The present disclosure generally relates to a lockable device, and more particular to a biometric fingerprint safe having a top opening wall which is released to upwardly fold at its opened position after verifying a fingerprint of a user. The biometric fingerprint safe includes a supporting mechanism provided between the housing and the lid for applying an upward force against the lid, a fingerprint module, a bolt matched with a latching mechanism installed in the housing, the latching mechanism has a motor electrically connected to the fingerprint module, a driving locking plate driven by an eccentric rod connected with the motor, a driven locking plate which is arranged side by side with the driving locking plate and synchronously actuated by the driving locking plate to rotate, so that the driven locking plate being matched with the bolt for locking or releasing the lid.

16 Claims, 5 Drawing Sheets

(51) Int. Cl.
*E05F 15/53* (2015.01)
*E05G 1/02* (2006.01)
*G06V 40/13* (2022.01)

(52) U.S. Cl.
CPC ............... *E05G 1/02* (2013.01); *G06V 40/13* (2022.01); *E05B 2047/0017* (2013.01); *E05Y 2201/22* (2013.01); *E05Y 2201/454* (2013.01); *E05Y 2201/456* (2013.01); *E05Y 2999/00* (2024.05)

(58) Field of Classification Search
CPC ............ E05B 65/5276; E05B 65/5284; E05B 2047/0017; E05B 1/04; E05B 2047/0024; E05B 47/0607; E05B 85/243; E05B 85/26; E05B 81/18; E05B 81/30; E05B 81/42

See application file for complete search history.

(56) References Cited

U.S. PATENT DOCUMENTS

| | | | |
|---|---|---|---|
| 5,881,584 A * | 3/1999 | Brunoski | E05B 47/0012 292/144 |
| 6,260,300 B1 * | 7/2001 | Klebes | F41A 17/066 42/70.11 |
| 9,260,890 B2 * | 2/2016 | Harrison | E05B 65/5284 |
| 9,777,514 B2 * | 10/2017 | Haidvogl | E05B 47/0607 |
| 10,253,529 B1 * | 4/2019 | McGinn | E05B 65/0075 |
| 11,274,469 B2 * | 3/2022 | Xu | E05B 65/5253 |
| 11,734,974 B2 * | 8/2023 | So | E05B 47/0012 340/5.82 |
| 2011/0056253 A1 * | 3/2011 | Greiner | E05B 47/0607 70/277 |
| 2012/0281889 A1 * | 11/2012 | Yang | E05B 65/0075 382/124 |
| 2013/0025511 A1 * | 1/2013 | Maxwell | E05G 1/04 109/59 R |
| 2018/0153311 A1 * | 6/2018 | Waggoner | F41C 33/06 |
| 2021/0324661 A1 * | 10/2021 | Stein | E05B 47/0012 |
| 2022/0251878 A1 * | 8/2022 | Weinerman | E05B 47/0607 |

FOREIGN PATENT DOCUMENTS

| | | | | |
|---|---|---|---|---|
| CN | 112647542 A | * | 4/2021 | ......... E02D 29/1427 |
| CN | 115419327 A | * | 12/2022 | |
| DE | 202019105516 U1 | * | 2/2021 | ......... E05B 15/0086 |
| KR | 20070012032 A | * | 1/2007 | |
| KR | 101200440 B1 | * | 11/2012 | |
| WO | WO-2020060901 A1 | * | 3/2020 | ......... E05B 47/0012 |
| WO | WO-2021064783 A1 | * | 4/2021 | |

OTHER PUBLICATIONS

Computer Generated Translation for DE 202019105516 U1, Generated on Feb. 4, 2025, https://worldwide.espacenet.com/ (Year: 2025).*

* cited by examiner

BIOMETRIC FINGERPRINT SAFE

CROSS-REFERENCE TO RELATED APPLICATIONS

The present application claims priority to Chinese Patent Application No. 202220029864.6 filed on Jan. 6, 2022, the content of which is incorporated herein by reference in its entirety.

TECHNICAL FIELD

The present disclosure generally relates to a lockable device, and more particular to a biometric fingerprint safe having a top opening wall which is released to upwardly fold at its opened position after verifying a fingerprint of a user.

BACKGROUND

A safe is a secure lockable cabinet for securing valuable objects, such as jewelries and watches, against theft or damage or for securing firearms, such as guns, to prevent access to unauthorized persons. A conventional safe generally comprises a box with a front accessing door and a locker for locking up the front accessing door at its closed position, wherein the box and the front accessing door may be cast from metal that the safe is relatively heavy for minimizing the portability of the safe. The safe generally is a numerical lock comprising a key pad, the user must enter a sequence of numbers in order to open the lock. If the key strength is set at lower level, the safe can be unlocked by figuring out a numerical puzzle. If the key strength is set at higher level, the user may forget the sequence of numbers. In housing of emergency, the user will take longer time to unlock the front accessing door so as to gain access of the safe. The safe should offer substantially instantaneous access to its interior, but only to its owner, even in total darkness. Further, the safe should be mountable on any desired surface, in such a way that it may not be removed therefrom by an unauthorized person without setting off an audible alarm.

An ever increasing number of people are keeping hand guns in their homes for protection. Keeping a loaded hand gun in the home is a constant worry, because of potential accidents and the possibility of coming home and finding an intruder waiting with the home owner's own gun. As far as is known, all hand gun locks on the market require keys for access. These types of hand gun locks do keep a gun from being discharged, but the key must be kept in another location, separate from the gun lock. The result is that when the home owner suddenly realizes that he needs his gun because of the presence of an intruder, much time could be lost searching for the key in darkness. Alternatively, if a gun lock is not used and the gun is kept unloaded in a closet, even more time can be lost in a crisis situation.

U.S. Pat. No. 7,116,224 discloses a portable housing for securing a firearm. The housing may include an electronic lock, but preferably includes a mechanical lock. U.S. Pat. No. 7,178,370 discloses a safe. A biometric sensor in the safe detects a fingerprint, actuating a solenoid to retract the latch if the fingerprint is recognized. The unlock response of these safes was not very timely.

SUMMARY

In view of this, the present disclosure is designed to provide a safe for a loaded hand gun to quickly unlock in various complicated situations.

A biometric fingerprint safe includes a housing with a chamber, a lid hinged with the housing and upwardly folded to expose at least a part of the chamber, a supporting mechanism provided between the housing and the lid for applying an upward force against the lid, a bolt fixed on the lid and having one end of the bolt movably linked to the supporting mechanism and the other end matched with a latching mechanism installed in the housing, a fingerprint module having a fingerprint window exposed on the housing for collecting fingerprints, a fingerprint detecting unit electrically connected to the fingerprint window, and a MCU controller; the latching mechanism having a motor electrically connected to the fingerprint module, a driving locking plate driven by an eccentric rod connected with the motor, a driven locking plate driven by the driving locking plate arranged side by side with the driving locking plate, the driven locking plate being matched with the bolt for locking or releasing the lid.

Preferably, the latching mechanism further includes a frame, a motor seat integrated with the frame for fixing the motor, a locking groove provided on the frame, the driving locking plate and the driven locking plate are arranged side by side on the frame, the driving locking plate is driven by the motor to force the driven locking plate rotates and moves to buckle the bolt, and the bolt is inserted into the locking groove.

Preferably, the driven locking plate includes a sheet-shaped body, a first protrusion extending from the sheet-shaped body toward a direction of the driving locking plate, a second protrusion, and a locking hole is provided on the bolt for being penetrated by the second protrusion.

Preferably, the driving locking plate includes a sheet-shaped body, a third protrusion extending from the sheet-shaped body toward a direction of the driven locking plate, a fourth protrusion adjacent to the third protrusion, and a recess formed by the third protrusion and the fourth protrusion for matching with the first protrusion.

Preferably, the driving locking plate further includes a fifth protrusion adjacent to the third protrusion for forming a second recess to receive the eccentric shaft for preventing the driving locking plate from rotating excessively.

Preferably, the eccentric rod driven by the motor is constrained in a recess on the sheet-shaped body of the driving locking plate so as to drive the driving locking plate to rotate.

Preferably, the frame includes a main body and a base integrally formed with the main body for accommodating the motor, the locking groove is formed by a first wall, a second wall, and a third wall integrated with the main body of the frame, Preferably, a cross section of the locking groove is in the shape of a letter U.

Preferably, the bolt includes a strip-shaped main body fixed on the lid, a tongue bending and extending from the main body toward a direction of the locking groove, a connecting piece flexibly connected with the supporting mechanism, the locking hole is provided on the tongue of the bolt.

Preferably, the supporting mechanism includes a cylinder, a piston rod telescopically slidable in the cylinder, a spring sleeved on the piston rod, and a piston assembly, one end of the piston rod away from the piston assembly is supported by the housing via a rotating shaft.

The present disclosure provides the fingerprint module of the safe instructs the latching mechanism to release or lock bolt after collecting a correct fingerprint signals so that the cover is opened or locked, thereby improving the safety and speed of unlocking the safe, and improving the anti-theft function of the safe.

BRIEF DESCRIPTION OF DRAWINGS

Many aspects of the embodiments can be better understood with reference to the following drawings. The components in the drawings are not necessarily drawn to scale, the emphasis instead being placed upon clearly illustrating the principles of the embodiment.

DETAILED DESCRIPTION

In order to make the objective, the technical solution and advantages of the present disclosure clearer, the following further describes the present disclosure in detail with reference to accompanying drawings and embodiments. It should be understood that specific embodiments described herein are only used to explain the present invention, but not to limit the present disclosure.

The same or similar reference numbers in the accompanying drawings of this embodiment correspond to the same or similar components. In the description of the present invention, it should be understood that if an orientational or positional relationship indicated by terms "upper", "lower", "left", "right" and the like is based on an orientational or positional relationship shown in the accompanying drawings, and is only for the convenience of describing the present invention and simplifying the description, rather than indicating or implying that the indicated apparatus or element must have a specific orientation or must be constructed and operated at a specific orientation, therefore, the terms describing the positional relationship in the accompanying drawings are only for exemplary description, and cannot be understood as a limitation of the patent. For those ordinarily skilled in the art, specific meanings of the above terms may be understood according to specific circumstances.

Figure 1:
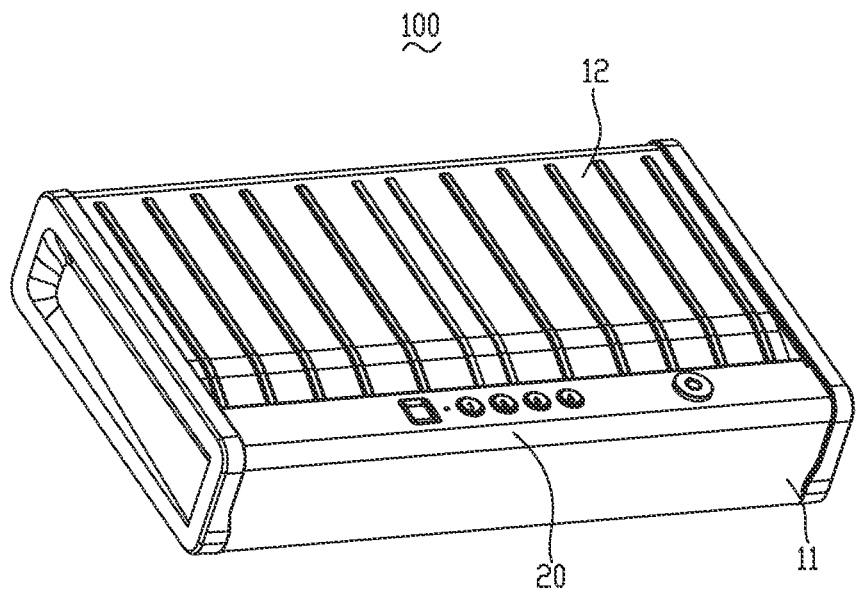
FIG. 1 is an isometric view of a biometric fingerprint safe in accordance with an embodiment of the present disclosure with its lid closed.
Figure 2:
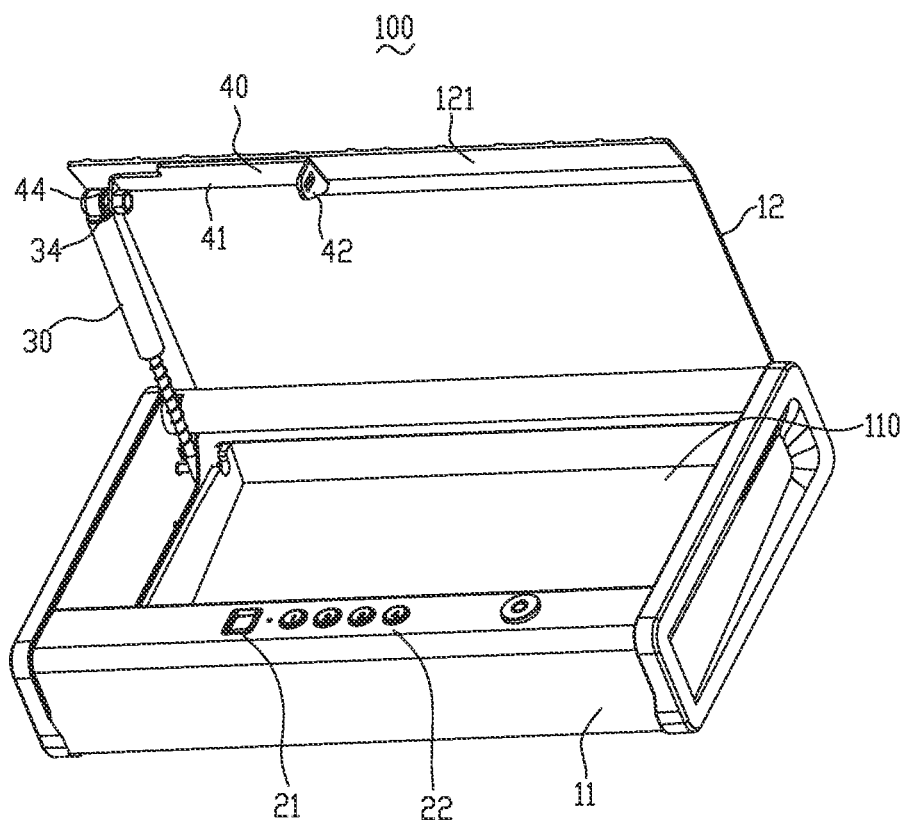
FIG. 2 is an isometric view of the biometric fingerprint safe in FIG. 1 with its cover open.
Figure 3:
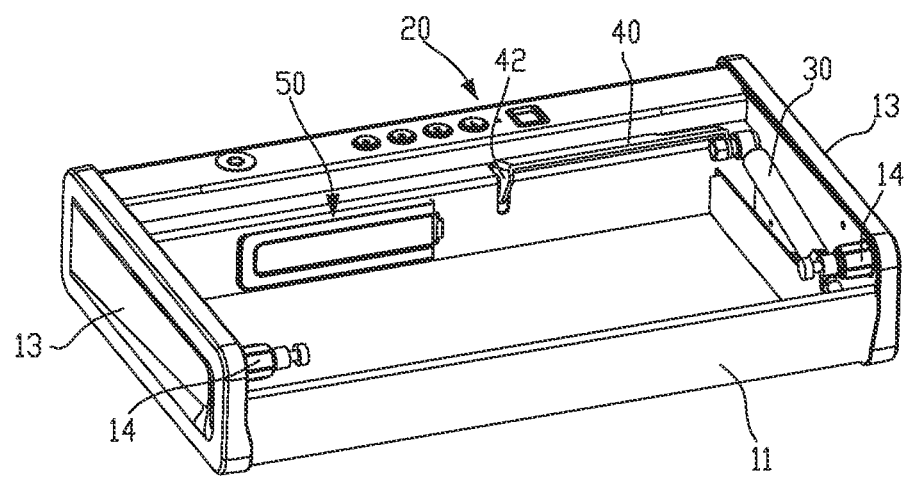
FIG. 3 is an isometric view of the biometric fingerprint safe in FIG. 1 with its lid being removed.
Figure 4:
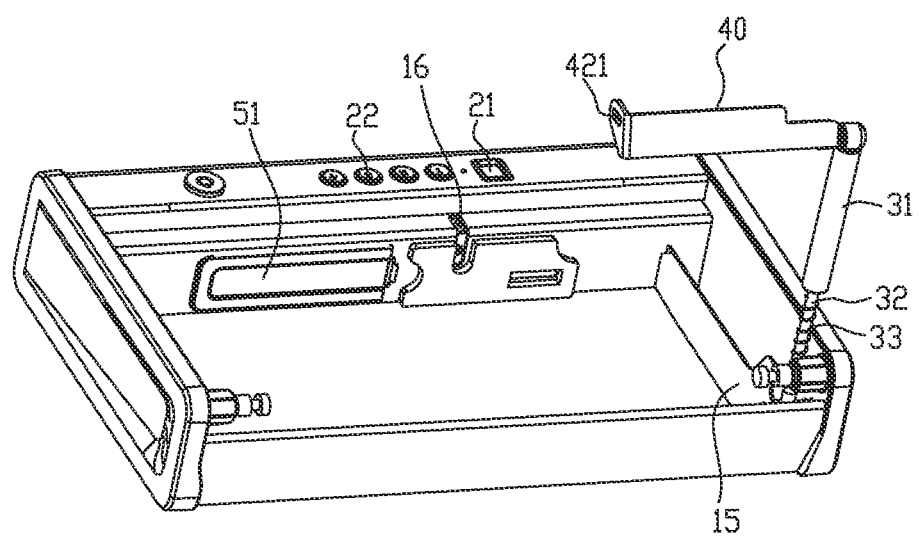
FIG. 4 is an isometric view of the biometric fingerprint safe in FIG. 3, with a bolt being released.
Figure 5:
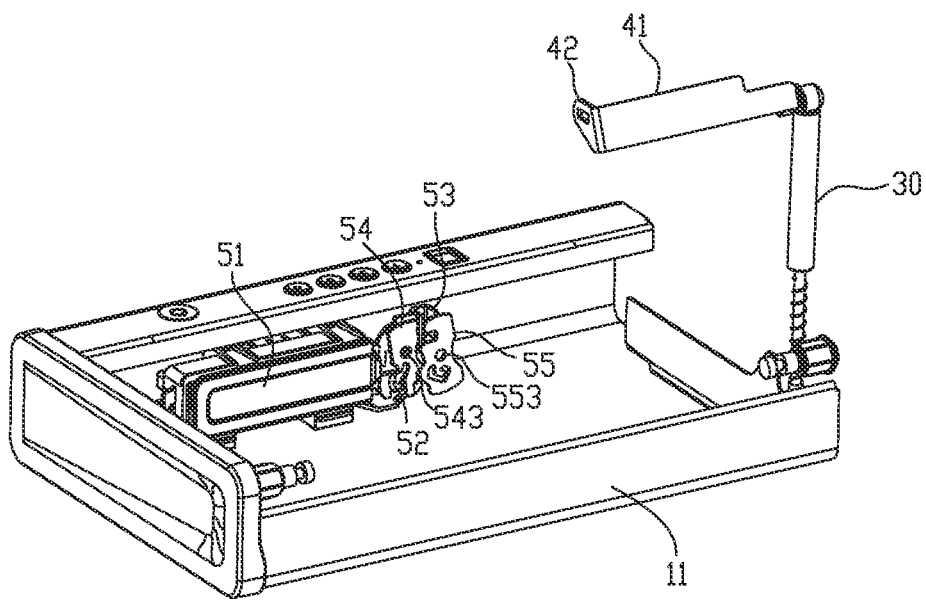
FIG. 5 is an isometric view of the biometric fingerprint safe in FIG. 4 with a latching mechanism being shown clearly, from another aspect.
Figure 6:
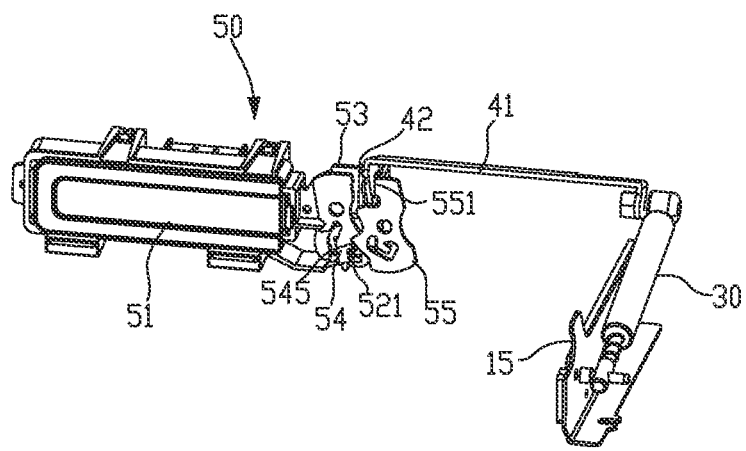
FIG. 6 is an isometric view of the bolt locked by the latching mechanism in FIG. 4.
Figure 7:
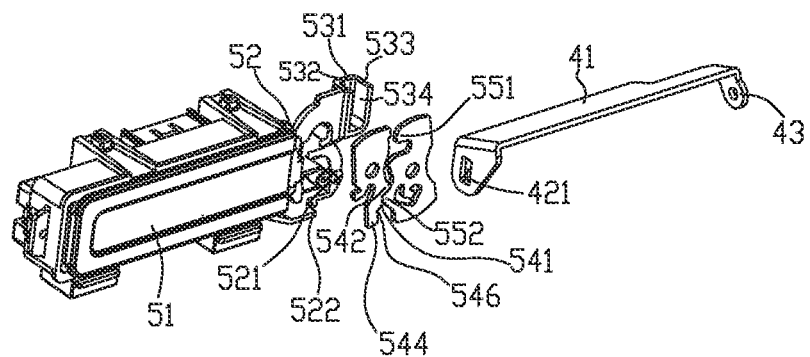
FIG. 7 is an isometric exploded view of the bolt and the latching mechanism in FIG. 6, from another aspect.
Figure 8:
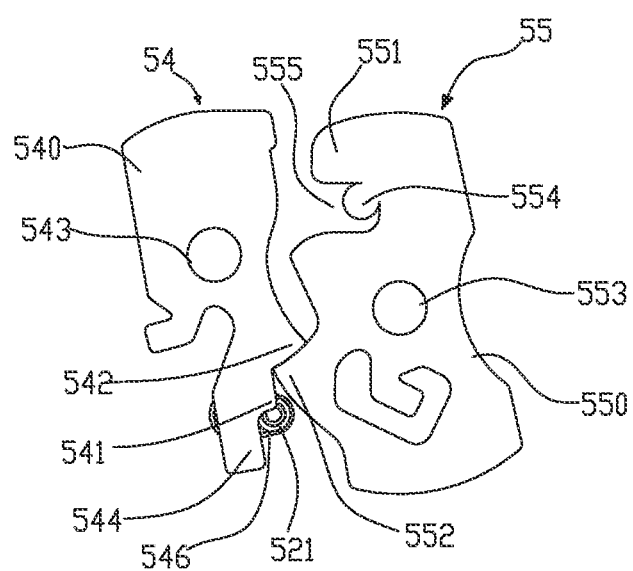
FIG. 8 depicts an assembled view of the driving locking plate and the driven locking plate in FIG. 6.
Figure 9:
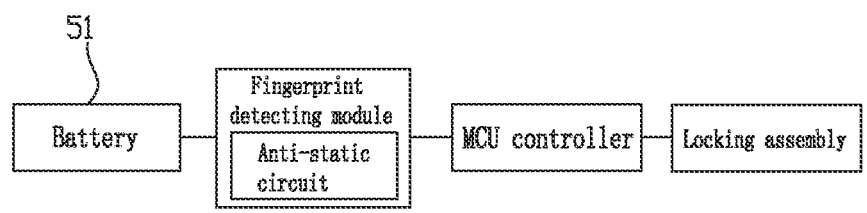
FIG. 9 is a schematic view of a configuration of a fingerprint module of the biometric fingerprint safe of the present disclosure.

The present disclosure will be described in detail below with reference to the attached drawings and embodiments thereof. FIGS. 1 to 9 illustrate a safe 100 constructed in accordance with the present disclosure. The safe 100 preferably has a durable case formed of steel or another suitable hardened material. The safe 100 includes a housing 11 in the shape of a rectangle with a chamber 110 for placing valuable jewelry or pistols and the like, a lid 12 hinged with the housing via a shaft 14 positioned on the housing 11 and upwardly liftable to expose at least a part of the chamber. A main part of the chamber is configured to place guns and the like, and a side space of the housing 11 for accommodating a supporting mechanism 30 and other components, such as a battery, a fingerprint module 20, a latching mechanism 50, and a bolt 40 matching the latching mechanism 50. The supporting mechanism 30 is provided between the housing 11 and the lid 12 for applying an upward force against the lid to retain the lid 12 at said opened position, such that the lid must be intentionally pressed down for overcoming said upward force to close said safe compartment. Two reinforced side panels 13 are installed on both sides of the housing 11 for enhancing safety. The chamber of the housing 11 is provided with a fingerprint module 20, and the fingerprint module 20 includes a fingerprint detecting module, a battery 51, an MCU (Microcontroller Unit) controller, and a fingerprint window 21 exposed on the surface of the housing 11. The fingerprint detecting module includes a fingerprint sensor and an algorithm chip (not shown in figure). The fingerprint sensor and the algorithm chip are electrically connected in sequence. While user's finger touches the fingerprint window 21, the fingerprint sensor converts the collected fingerprint into an electrical signal, which is transmitted to the algorithm chip, and the algorithm chip compares the detected electrical signal with the pre-stored signal, and then sends a command to the MCU controller, so that the MCU controller controls a latching mechanism to realize unlocking or locking. The MCU controller in the fingerprint detecting module has three resistors, which are a first resistor, a second resistor, and a third resistor. A touch signal output pin of the MCU controller is electrically connected to the first resistor, and a data sending pin is electrically connected to the second resistor, and a data receiving pin is electrically connected to the third resistor.

In the embodiment, in addition to the fingerprint window 21 for collecting fingerprint, a number of number keys 22 are arranged on the surface of the housing 11. In addition to outputting fingerprint through the fingerprint window 21 to open the lid, user can also input a password via the number keys 22 to open the lid 12.

Furthermore, the fingerprint detecting module of the present disclosure further includes an anti-static circuit. By providing the anti-static circuit on the back side of the circuit board of the fingerprint detecting module, the fingerprint detecting module has an anti-static protection function while it is working normally, so as to avoid static electricity generated while the human finger touches the fingerprint module 20, which prolongs the service life of the fingerprint code lock, has the characteristics of strong functionality and high security.

The safe 100 is provided with the supporting mechanism 30 in the chamber for movable supporting the lid 12 to close or open. One end of the supporting mechanism 30 is connected with the bolt 40 fixed on the lid by a positioned pin 34, the other end is rotatably connected to a wall 15 of the housing 11. The wall 15 here means a partition plate in the chamber of the housing 11. The supporting mechanism 30 includes a pneumatic cylinder 31, a piston rod 32 telescopically slided in the pneumatic cylinder 31, and a spring 33 sleeved on the piston rod 32. A sealing plug is provided at one end of the piston rod 32 located in the cylinder barrel 31, and the other end away from the sealing plug is supported by the housing 11. The spring 33 is a compression spring coaxially coupled at the piston rod 32 for applying a spring force against the pneumatic cylinder 31. When the lid 12 is pivotally moved from the opened position to the closed position to reduce the distance between the upper and lower ends of the pneumatic cylinder 31, the spring 33 will be forced to compress so as to restore a spring force at the spring 33. When the lid 12 is pivotally moved to the opened position from the closed position initially, the restored spring force will be transmitted to the lid 12 to initially and upwardly push thereat such that the lid 12 can be easily lifted up.

In the embodiment, the bolt 40 includes a a strip-shaped main body 41 fixed on the lid 12 away from the hinge, a tongue 42 bending and extending from the main body 41 toward the latching mechanism 50 received in the housing 11, a connecting piece 43 extending from the other end of the main body 41 and rotatably connected to supporting mechanism 30. The tongue 42 is basically extended in the central area on one side of the lid 12. A locking hole 421 is provided on the tongue 42 for locking the latching mechanism 50. It can be clearly seen from FIG. 4, the extension direction of supporting mechanism 30 and the bolt 40 are arranged perpendicular to each other. The housing 11 is provided with a slot 16 for guiding the tongue 42 can be inserted into the latching mechanism 50. The slot 16 is provided on a part of the housing, such as a partition plate, which encloses an inner cavity for holding the latching mechanism 50.

The latching mechanism 50 includes a motor 52 electrically connected to the fingerprint module 20 and a locking assembly. The locking assembly is driven by the motor 52 to lock or release the tongue of the bolt 40. The locking assembly includes a supporting frame 53 integrally formed with a small shell where a power module 51 is installed, a driving locking plate 54 and a driven locking plate 55 driven by the driving locking plate 54, and a locking groove 534 provided on the supporting frame 53. The driven locking plate 55 is arranged side by side with the driving locking plate 54. The driving locking plate 54 is driven by the motor 52 to force the driven locking plate 55 to rotate and displace the tongue 42.

The driven locking plate 55 includes a sheet-like body 550, a first protrusion 552 extending from the sheet-like body toward the driving locking plate 54, and a second protrusion 551 which can be inserted into the locking hole 421 of the tongue 42. The driving locking plate 54 and the driven locking plate may be arranged coplanar, that is, a surface of the driving locking plate 54 and the driven locking plate 55 are on the same horizontal plane. The driving locking plate 54 includes a sheet-shaped body 540, a third protrusion 541 extending from the sheet-shaped body toward the driven locking plate 55, and a fourth protrusion 542 adjacent to the third protrusion 541. The third protrusions 541 and the fourth protrusion 542 form a first recess 545 that matches with the first protrusion 552 of the driven locking plate 55. The sheet-shaped body 540 of the driving locking plate 54 is flush with the sheet-shaped body 540 of the driven locking plate 55, that is, they are arranged side by side and coplanar. As a result, the third protrusion 541 and the fourth protrusion 542 are matched with the first protrusion 552 in a similar meshing manner. The term "meshing manner" here means that the first protrusion 552 is bitten between the third protrusion 541 and the fourth protrusion 542. When the driving locking plate 54 is driven by the eccentric rod 521 and rotates clockwise or counterclockwise, the first protrusion 552 rotates synchronously. In the present embodiment, the second protrusion 551 bends and extends from the sheet-like body 550 to form a gap 555 with the sheet-like body 550. Since the second protrusion 551 pierces the tongue 42, a portion of the tongue 42 may be contained in the gap 555 of the driven locking plate 55. In order to prevent the portion of the tongue 42 from being stuck in the gap 555, a stopper 554 located in the valley region of the gap 555 extends from the second protrusion 551 for abutting the portion of the tongue 42. Alternatively, the stopper 554 may be made from elastic material, such as rubber, which is installed at the bottom of the gap 555 for reducing the impact from the tongue 42.

In the embodiment, a fifth protrusion 544 extends from the sheet-like body 540 and is adjacent to the third protrusion 541. A second groove 546 is formed between the fifth protrusion 554 and the third protrusion 541. The eccentric rod 521 is displaced in the second groove 546. Due to the limitation of the fifth protrusion 554 and the third protrusion 541, the eccentric rod 521 may abuts one of the the fifth protrusion 554 and the third protrusion 541, and the displacement path of the eccentric rod 521 is not a complete circle, so as to prevent the driven locking plate 55 from rotating excessively.

The motor 52 installed on the rear side of the driving locking plate 54 starts to rotate after receiving a correct signal from the MCU controller. The motor 52 includes a motor body and an eccentric shaft 521 rotatably driven by the motor body. The eccentric shaft 521 abuts against the fourth protrusion 542 to drive the driving locking plate 54 to rotate and move in a direction perpendicular to the eccentric shaft 521.

The driving locking plate 54 is displaced under the drive of the motor with a rotating center 543 which is located in the central area as a center point, and the fourth protrusion 542 can pry the adjacent first protrusion 552 to move, thereby moving the driven locking plate 55. The rotation directions of the driven locking plate 55 and the driving locking plate 54 are opposite. In this way, the second protrusion 551 located on the other side of the rotation center 553 of the driven locking plate 55 moves, so that the second protrusion 551 can be inserted into the locking hole 421 or drawn out of the locking hole 421 of the tongue 42, then lock tongue 42 is completely withdrawn from locking groove 534 via supporting mechanism 30 to open the lid 12.

In order to reinforce the tongue 42, the supporting frame 53 includes a frame and a base 522 integrally formed with the frame for accommodating the motor 52. The frame of the supporting frame 53 is provided with a first wall 531, a second wall 532 and a third wall 533 which are enclosed to form the locking groove 534. The first wall 531, the second wall 532, and the third wall 533 form a U-shaped groove 534. The tongue 42 of the bolt 40 may be inserted into the U-shaped groove 534 through the slot 16.

While the lid 12 is closed, the tongue 42 of the bolt 40 is inserted into the locking groove 534 through the slot 16, and the second protrusion 551 of the driven lock piece 55 is inserted into the locking hole 421 of the tongue 42 to oppose the bolt 40 is locked to close the lid 12. While the fingerprint module 20 collects the correct fingerprint signal and instructs the motor 52 to work, the eccentric shaft 521 of the motor rotates to drive the third protrusion 541 of the driving locking plate 54 to force the driven locking plate 54 to rotate, thereby causing the first protrusion 552 to move. As a result, the driven locking plate 55 is rotated so that the second protrusion 551 is withdrawn from the locking hole 421 of the tongue 42. Then the tongue 42 is pulled away from the locking groove 534 under the linkage of the supporting mechanism 30, and the cover 12 is opened. The fingerprint safe of the present disclosure has a firm and reliable structure, and the use of the fingerprint module makes the unlocking process quick and convenient, and also greatly improves the safety of the safe 100.

While the present disclosure has been described with reference to a specific embodiment, the description of the disclosure is illustrative and is not to be construed as limiting the disclosure. Various of modifications to the present disclosure can be made to the exemplary embodiment by those skilled in the art without departing from the true spirit and scope of the disclosure as defined by the appended claims.

What is claimed is:

1. A biometric fingerprint safe comprising a housing with a chamber, a lid hinged with the housing and upwardly liftable to expose at least a part of the chamber, a supporting mechanism provided between the housing and the lid for applying an upward force against the lid,
   wherein a bolt is fixed on the lid and the bolt has one end connected to and movable with the lid by the supporting mechanism and an opposite end matched with a latching mechanism installed in the housing;
   wherein the housing includes a fingerprint module having a fingerprint window that is exposed on the housing for collecting fingerprints, a fingerprint detecting unit electrically connected to the fingerprint window, and an MCU controller;
   wherein the latching mechanism has a motor electrically connected to the fingerprint module, a driving locking plate driven by an eccentric rod connected with the motor, and a driven locking plate which is arranged side by side and coplanar with the driving locking plate, wherein the driven locking plate is selectively drivable by the driving locking plate to rotate, so that the driven locking plate is selectively set in a first condition of engaging with the bolt for locking the lid and a second condition of disengaging from the bolt for releasing the lid; and
   wherein the driven locking plate comprises a sheet-shaped body, a first protrusion extending from the sheet-shaped body of the driven locking plate in a direction toward the driving locking plate, and a second protrusion formed on the sheet-shaped body of the driven locking plate; and the driving locking plate comprises a sheet-shaped body coplanar with the sheet-shaped body of the driven locking plate, a third protrusion extending from the sheet-shaped body of the driving locking plate in a direction toward the driven locking plate, and a fourth protrusion formed on the sheet-shaped body of the driving locking plate and adjacent to the third protrusion, wherein a first recess is defined between the third protrusion and the fourth protrusion and the first protrusion of the driven locking plate is received in the first recess and co-planarly located between the third protrusion and the fourth protrusion of the driving locking plate, and the eccentric rod, such that the driven locking plate is set in the second condition, the first protrusion of the driven locking plate being selectively drivable by the third protrusion of the driving locking plate to rotate in a first direction for setting the driven locking plate in the second condition and drivable by the fourth protrusion of the driving locking plate to rotate in a second direction opposite to the first direction for setting the driven locking plate in the first condition.

2. The biometric fingerprint safe as described in claim 1, wherein the latching mechanism further includes a frame, on which the motor is mounted, wherein a locking groove is provided on the frame to selectively receive the bolt to insert into the locking groove; the driving locking plate and the driven locking plate are arranged side by side on the frame; and the driving locking plate is driven by the motor to force the driven locking plate to rotate so as to buckle the bolt inserted into the locking groove.

3. The biometric fingerprint safe as described in claim 2, wherein the frame includes a main body and a base integrally formed with the main body for accommodating the motor, and the locking groove is formed by a first wall, a second wall, and a third wall integrated with the main body of the frame.

4. The biometric fingerprint safe as described in claim 3, wherein a cross section of the locking groove is in the shape of a letter U.

5. The biometric fingerprint safe as described in claim 1, wherein a locking hole is provided on the bolt and is engageable by the second protrusion for locking the lid.

6. The biometric fingerprint safe as described in claim 5, wherein the bolt includes a strip-shaped main body fixed on the lid, a tongue bending and extending from the main body in a direction toward the locking groove, a connecting piece connected with the supporting mechanism, wherein the locking hole that is provided on the bolt is formed in the tongue of the bolt.

7. The biometric fingerprint safe as described in claim 6, wherein the second protrusion bends and extends from the sheet-shaped body of the driven locking plate to form a gap with the sheet-shaped body of the driven locking plate.

8. The biometric fingerprint safe as described in claim 7, wherein a stopper, located at a bottom of the gap, is provided on the second protrusion for abutting the tongue of the bolt.

9. The biometric fingerprint safe as described in claim 1, wherein the driving locking plate further includes a fifth protrusion adjacent to the third protrusion for forming a second recess to receive the eccentric rod for preventing the driving locking plate from rotating excessively.

10. The biometric fingerprint safe as described in claim 1, wherein the eccentric rod, driven by the motor, is received in a second recess on the sheet-shaped body of the driving locking plate so as to drive the driving locking plate to rotate.

11. The biometric fingerprint safe as described in claim 1, wherein the supporting mechanism includes a cylinder, a piston rod telescopically slidable in the cylinder, and a spring sleeved on the piston rod, wherein one end of the piston rod is supported by the housing via a rotating shaft.

12. A biometric fingerprint safe, comprising:
    a housing with a chamber,
    a lid hinged with the housing and upwardly liftable to expose at least a part of the chamber,
    a supporting mechanism provided between the housing and the lid for applying an upward force against the lid;
    a latching mechanism installed in the housing;
    a bolt fixed on the lid, including a tongue extending toward the latching mechanism; and
    a fingerprint module provided on the housing;
    wherein the latching mechanism comprises a motor controlled by the fingerprint module, a driving locking plate, and a driven locking plate; the motor comprises a motor body and an eccentric rod rotatably driven by the motor body;
    the driven locking plate comprises a sheet-shaped body, and a first protrusion and a second protrusion extending from the sheet-shaped body of the driven locking plate in a direction toward the driving locking plate;
    the driving locking plate comprises a sheet-shaped body, and a third protrusion and a fourth protrusion extending from the sheet-shaped body of the driving locking plate in a direction toward the first protrusion;

a first recess is defined between the third protrusion and the fourth protrusion, the first protrusion is received in the first recess;

the eccentric rod abuts against the third protrusion to drive the driving locking plate to rotate in a first direction perpendicular to the eccentric rod, such that the first protrusion is drivable by the third protrusion to rotate in a second direction opposite to the first direction, so that the second protrusion is drawn out of the tongue.

13. The biometric fingerprint safe in claim 12, wherein a fifth protrusion adjacent to the third protrusion extends from the sheet-shaped body of the driving locking plate, a second recess is defined between the fifth protrusion and the third protrusion, and the eccentric rod is displaced in the second recess, for restricting the eccentric rod to abut one of the fifth protrusion and the third protrusion and preventing the driven locking plate from rotating excessively.

14. The biometric fingerprint safe in claim 12, wherein the first protrusion and the second protrusion are respectively located on two opposite sides of a line connecting a rotating center of the driving locking plate and a rotation center of the driven locking plate.

15. The biometric fingerprint safe in claim 12, wherein a gap is defined between the second protrusion and sheet-shaped body of the driving locking plate for receiving at least a portion of the tongue, and a stopper extends from the second protrusion to the gap for abutting the portion of the tongue.

16. The biometric fingerprint safe in claim 12, wherein a gap is defined between the second protrusion and sheet-shaped body of the driving locking plate for receiving at least a portion of the tongue, and a stopper made from elastic material is installed at the gap for reducing the impact from the tongue.

* * * * *